(No Model.)
T. DERRICK.
THILL SHACKLE.
No. 364,634. Patented June 14, 1887.
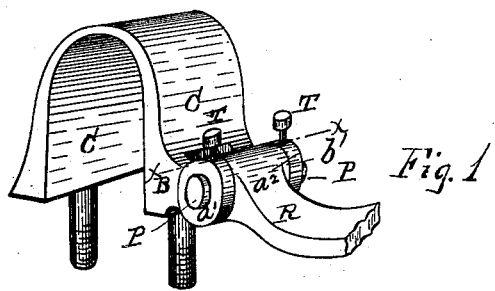
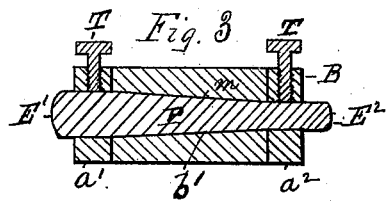
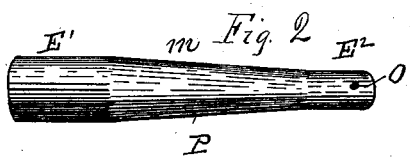
WITNESSES
Charles S. Bruntnall
Geo. A. Darby
INVENTOR
Thomas Derrick
by W. E. Hagan
his atty

UNITED STATES PATENT OFFICE.

THOMAS DERRICK, OF LANSINGBURG, NEW YORK, ASSIGNOR OF ONE-HALF TO WILLIAM E. DERRICK, OF SAME PLACE.

THILL-SHACKLE.

SPECIFICATION forming part of Letters Patent No. 364,634, dated June 14, 1887.

Application filed January 3, 1887. Serial No. 223,254. (No model.)

*To all whom it may concern:*

Be it known that I, THOMAS DERRICK, of the village of Lansingburg, county of Rensselaer, State of New York, have invented new and useful Improvements in Thill-Shackles, of which the following is a specification.

My invention relates to improvements in thill-shackles; and the object and purpose of my invention are to make them durable in the operation of their working parts and to make their action noiseless.

My invention consists (as will be more fully described hereinafter in connection with its illustration and detailed in the claims) of the combination, in a thill-shackle, of a bearing for the thill that is made to taper, and with the journal-pin, on which the thill reciprocatingly rotates, also made with a corresponding taper, with the ends of the journal-pin and the eyes on the bracket in which the ends are entered made coincidently straight, and without any taper, said eyes being constructed with set-screws to secure the ends of the hinging-pin therein.

Accompanying this specification, to form a part of it, there is a sheet of drawings containing three figures illustrating my invention, with the same designation of parts by letter-reference used in all of them.

Of these illustrations, Figure 1 is a perspective of a thill-shackle containing my invention. Fig. 2 is a view of the hinging-pin shown as detached, and Fig. 3 is a vertical section taken on the line $xx$ of Fig. 1.

The several parts of the mechanism thus illustrated are designated by letter-reference, and the function of the parts is described as follows:

The letter B designates the bracket extending from the front axle and connected thereto by the clip C, and with which bracket the thill R connects to form the shackle.

The letter $b'$ indicates the bearing formed in the thill end, and this bearing is tapering in form.

The letter P indicates the hinging-pin or journal on which the thill-bearing reciprocatingly rotates. The central portion of this pin P, where within the bearing $b'$, and indicated at $m$, is made to taper coincidently with the bearing; but at the ends $E'$ $E^2$ the cylindrical faces of this pin are made straight and without any taper. The ears $a'$ $a^2$, made on the bracket B, through which the pin P is passed, so as to intermediately journal in the bearing $b'$, are made straight and so as to coincide with and receive the ends $E'$ $E^2$ of the pin P, that one of the ears $a'$ being made to receive the larger end $E'$ of the pin P, and the ear $a^2$ being made smaller than the one indicated at $a'$ and adapted to receive the smaller end $E^2$ of the pin P.

The letters T T designate set-screws arranged in the ears $a'$ $a^2$, each of which set-screws is arranged, when screwed in, to engage with that end of the pin which is thereto adjacent, so as to keep the pin in place.

The letter O indicates a hole made in the smaller end of the pin P to receive a keeper.

The advantages of this construction and improvement in thill-shackles are, that as the bearing wears, so as to make the engagement of the latter and the pin loose, thus causing it to rattle, on freeing the journal-pin at the ends by running out the set-screws and driving in the journal-pin, this slack produced by wear may be taken up, and then by again securing the journal-pin at the ends by means of the set-screws the action of the shackle is again rendered noiseless.

I am aware that a cylindrical coupling-pin formed with annular grooves, and having set-screws let through the clip-ears and thill-iron to project into the annular grooves, has been heretofore made; and, also, that a thill-coupling has been made in which the thill-iron has a conical eye and the clip-ears provided with holes of different size to take a coupling-pin having a conical middle portion, and cylindrical screw-threaded ends to take jam-nuts, and I make no claim thereto, my improvements consisting in making the coupling-pin entirely plain and smooth on the surface, and formed with a conical middle part to set in the eye of the thill-iron, and then letting the set-screws through the clip-ears onto the smooth cylindrical ends of the coupling-pin. I thus simplify and improve existing constructions by dispensing with expensive and particular constructions and using a coupling-pin of the simplest form.

Having thus described my invention, what I claim, and desire to secure by Letters Patent, is—

The combination, with an axle-clip formed with thill-ears having bolt-holes of different diameters, and provided with set-screws let through the ears into the pin-holes thereof, and a thill-iron formed with a conical aperture, of a coupling-pin having a smooth plain surface throughout, and formed with a conical middle portion and cylindrical plain ends, substantially as described.

Signed at Troy, New York, this 15th day of November, 1886, in the presence of the two witnesses whose names are hereto written.

THOMAS DERRICK.

Witnesses:
CHARLES S. BRINTNALL,
N. E. HOGAN.